(12) United States Patent
Jin et al.

(10) Patent No.: US 11,086,653 B2
(45) Date of Patent: Aug. 10, 2021

(54) FORWARDING POLICY CONFIGURATION

(71) Applicant: New H3C Technologies Co., Ltd., Hangzhou (CN)

(72) Inventors: Xiaoting Jin, Beijing (CN); Wei Wang, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 84 days.

(21) Appl. No.: 16/318,311

(22) PCT Filed: Aug. 9, 2017

(86) PCT No.: PCT/CN2017/096648
§ 371 (c)(1),
(2) Date: Jan. 16, 2019

(87) PCT Pub. No.: WO2018/028606
PCT Pub. Date: Feb. 15, 2018

(65) Prior Publication Data
US 2019/0235909 A1    Aug. 1, 2019

(30) Foreign Application Priority Data
Aug. 11, 2016 (CN) .......................... 201610661890.X

(51) Int. Cl.
*G06F 9/44* (2018.01)
*G06F 9/455* (2018.01)
(Continued)

(52) U.S. Cl.
CPC .......... *G06F 9/45558* (2013.01); *G06F 9/542* (2013.01); *H04L 41/00* (2013.01);
(Continued)

(58) Field of Classification Search
CPC ................. G06F 9/45558; G06F 9/542; G06F 2009/45595; H04L 41/046; H04L 49/354; H04L 61/6022
See application file for complete search history.

(56) References Cited

U.S. PATENT DOCUMENTS 8,301,753 B1 * 10/2012 Melvin ................. H04L 61/103
    709/224
8,312,129 B1    11/2012 Miller et al.
(Continued)

FOREIGN PATENT DOCUMENTS

CN    105227454    1/1916
CN    105657078    6/1916
(Continued)

OTHER PUBLICATIONS

International Search Report and Written Opinion issued in PCT/CN2017/096648, dated Nov. 9, 2017.
(Continued)

*Primary Examiner* — Hang Pan
(74) *Attorney, Agent, or Firm* — Norton Rose Fulbright US LLP

(57) ABSTRACT

A method of configuring a forwarding policy, a cloud management platform and an intelligent network management center are provided in the present disclosure. In an examples, the cloud management platform obtains a first mapping between a virtual machine and a network device, and transmits a first notification message to an intelligent network management center associated with the network device in a way that the intelligent network management center configures a forwarding policy associated with the virtual machine for the network device according to the first notification message, wherein the first notification message comprises virtual machine information of the virtual machine and network device information of the network
(Continued)

---

401 — The intelligent network management center receives a notification message from the cloud management platform, where the notification message carries virtual machine information of a virtual machine and network device information of a network device, where the network device has a first mapping with the virtual machine 402 — The intelligent network management center configures a forwarding policy associated with the virtual machine for the network device according to the notification message, where the forwarding policy indicates that the network device performs processing for a packet associated with the virtual machine device, and the forwarding policy instructs the network device to perform processing for a packet associated with the virtual machine.

15 Claims, 4 Drawing Sheets

(51) Int. Cl.
*H04L 12/24* (2006.01)
*G06F 9/54* (2006.01)
*H04L 12/931* (2013.01)
*H04L 29/12* (2006.01)

(52) U.S. Cl.
CPC .......... *H04L 41/046* (2013.01); *H04L 49/354* (2013.01); *H04L 61/6022* (2013.01); *G06F 2009/45595* (2013.01)

(56) References Cited

U.S. PATENT DOCUMENTS

| | | | |
|---|---|---|---|
| 2004/0098511 A1* | 5/2004 | Lin ....................... | H04L 69/329 709/249 |
| 2005/0002380 A1* | 1/2005 | Miller ..................... | H04L 41/12 370/352 |
| 2011/0202920 A1 | 8/2011 | Takase | |
| 2013/0304917 A1* | 11/2013 | Mittal ................... | H04L 63/101 709/225 |
| 2015/0263897 A1 | 9/2015 | Ganichev et al. | |
| 2018/0139123 A1* | 5/2018 | Qiang ..................... | H04L 45/24 |

FOREIGN PATENT DOCUMENTS

| | | |
|---|---|---|
| CN | 105681188 | 6/1916 |
| CN | 102136931 | 7/2011 |
| CN | 103281248 | 9/2013 |
| CN | 104243608 | 12/2014 |
| CN | 104486246 | 4/2015 |
| CN | 104601427 | 5/2015 |
| EP | 2725737 | 4/2014 |
| EP | 2728470 | 5/2014 |
| JP | 2013258446 | 12/2013 |
| JP | 2015015763 | 1/2015 |
| JP | 2015195519 | 11/2015 |
| WO | WO 2015/149253 | 10/2015 |
| WO | WO 2015173759 | 11/2015 |

OTHER PUBLICATIONS

Office Action issued in corresponding Japanese Application No. 2019506706, dated Nov. 26, 2019 (English Translation provided).
Yasuhiro Kawai, et al., Research on Policy Networks, Nikkei Internet Technology, Oct. 1999, No. 27, pp. 84-105 (English Translation provided).
Notification to Grant Patent Right for Invention issued in corresponding Chinese Application No. 201610661890, dated Mar. 3, 2020 (English Translation Provided).
Office Action issued in corresponding Japanese Application No. 2019-506706, dated Mar. 17, 2020 (English Translation Provided).
Office Action issued in Corresponding Chinese Patent Application No. 201610661890, dated Jul. 1, 2019. (English Translation).
Search Report issued in Corresponding European Patent Application No. 17838736, dated May 31, 2019.

* cited by examiner

FORWARDING POLICY CONFIGURATION

CROSS-REFERENCE TO RELATED APPLICATIONS

This application is a national phase under 35 U.S.C. § 371 of International Application No. PCT/CN2017/096648, filed Aug. 9, 2017, which claims priority to Chinese Patent Application No. 201610661890.X entitled "METHOD AND DEVICE FOR CONFIGURING FORWARDING POLICY" filed on Aug. 11, 2016, the entire contents of each of which are hereby incorporated by reference in their entirety.

BACKGROUND

A data center may include a network constructed by a Software Defined Network (SDN) and a Virtual eXtensible Local Area Network (VXLAN). And the SDN is based on new network architecture. In particular, in the SDN, a control plane and a forwarding plane of a network device are separated, thus, traffic in the network may be centrally and flexibly controlled by a controller (e.g., an SDN controller), thereby providing a good platform for core networks and applications.

DETAILED DESCRIPTION OF THE EMBODIMENTS

The technical solutions of embodiments of the present disclosure will be described clearly and fully below in combination with drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

In a Virtual Local Area Network (VLAN), logic isolation is required among different tenants on a layer-2 domain. However, at most 4096 logic isolation areas are supported in the layer-2 domain of the VLAN, thus, the VLAN cannot satisfy a rapidly increasing of tenants. Accordingly, a VXLAN technique arises. In the VXLAN, there is a larger identifier space for identifying logic isolation areas. Further, the VXLAN runs on a layer-3 network, so as to make deployment and maintenance easier.

Figure 1:
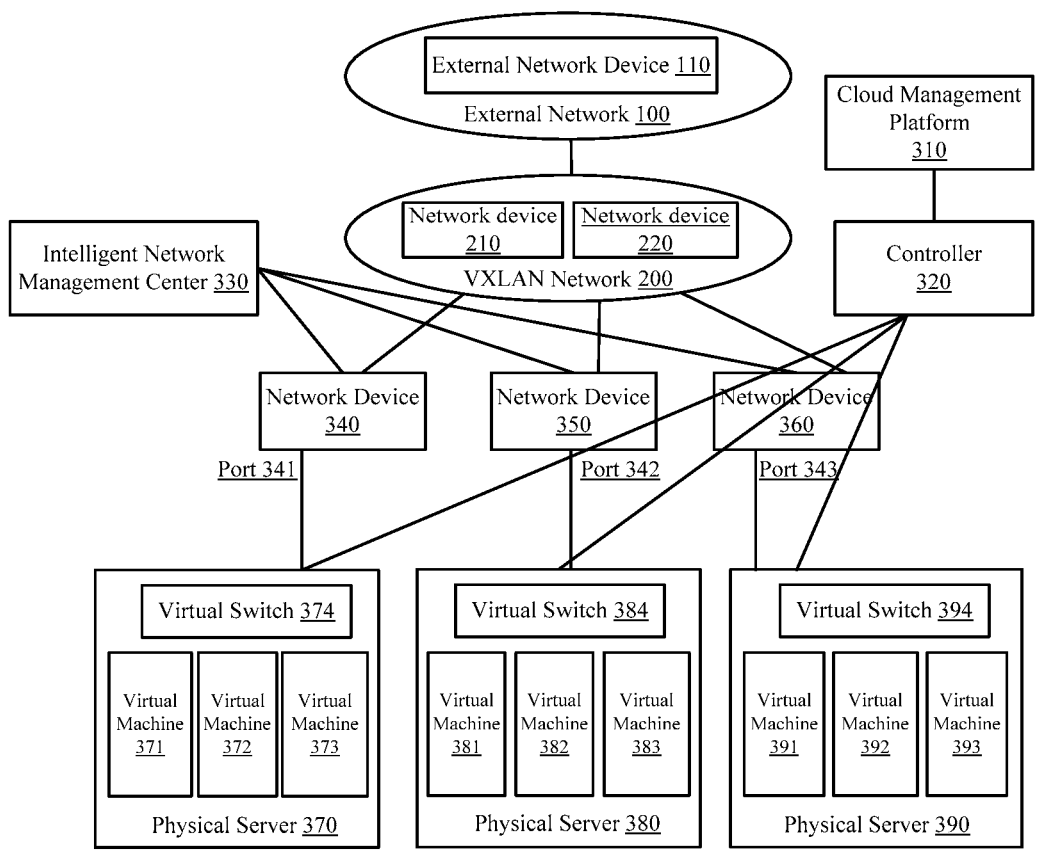
FIG. 1 is a schematic diagram illustrating an application scenario according to an example of the present disclosure.

According to examples of the present disclosure, methods of configuring a forwarding policy are provided, which may apply to a data center. The data center may be based on network architecture of SDN and VXLAN. In particular, the data center may include, but not limited to, a network which includes a physical server, a controller (e.g., an SDN controller), a cloud management platform, a network device, and an intelligent network management center. FIG. 1 is a schematic diagram illustrating an application scenario according to an example of the present disclosure. As shown in FIG. 1, a physical server 370 is configured with a virtual machine 371, a virtual machine 372, a virtual machine 373 and a virtual switch 374. A physical server 380 is configured with a virtual machine 381, a virtual machine 382, a virtual machine 383 and a virtual switch 384. A physical server 390 is configured with a virtual machine 391, a virtual machine 392, a virtual machine 393 and a virtual switch 394. A network device 340 is connected with the physical server 370. A network device 350 is connected with the physical server 380. A network device 360 is connected with the physical server 390.

In an example, a cloud management platform may be deployed in the network. The cloud management platform manages a large amount of computing resources, storage resources as well as network resources, and assigns corresponding virtual machines to tenants. For example, as shown in FIG. 1, a cloud management platform 310 may assign a virtual machine 371, a virtual machine 372, and a virtual machine 373 for a tenant 1 on a physical server 370, assign a virtual machine 381, a virtual machine 382, and a virtual machine 383 for a tenant 2 on a physical server 380, and assign a virtual machine 391, a virtual machine 392, and a virtual machine 393 for tenant 3 on a physical server 390.

In an example, an intelligent network management center may be deployed in the network. The intelligent network management center may manage network devices. The network device may be a router or a switch. For example, as shown in FIG. 1, an intelligent network management device 330 may manage a network device 340 connected with the physical server 370, a network device 350 connected with the physical server 380, a network device 360 connected with the physical server 390, a network device 210 and a network device 220 in a VXLAN network 200, etc.

In FIG. 1, an overlay network includes virtual machines and virtual switches on various physical servers. And the cloud management platform may manage the virtual machines and the virtual switches in the overlay network. An underlay network includes network devices connected with physical serveries, various network devices in a VXLAN network, etc. And the intelligent network management center may manage various devices in the underlay network.

In the application scenario above, in the overlay network, after a packet to be transmitted from the virtual machine 371 to the virtual machine 381 arrives at the virtual switch 374, according to an overlay network planning, the virtual switch 374 may set a corresponding forwarding policy associated with the overlay network for the packet, perform VXLAN encapsulation for the packet, and transmit a packet obtained through VXLAN encapsulation to the network device 340, so that the packet is to be transmitted in the underlay network. In the underlay network, after the packet is received, the network device 340 can transmit the packet according to a destination IP address associated with the packet, because the forwarding policy in the overlay network is not supported in the underlay network. Thus, the forwarding policy in the overlay network cannot be reflected in the underlay network, which causes that processing in the overlay network is inconsistent with that in the underlay network.

For the problems above, in an example, the network planning for the overlay network may apply to the underlay network, so that the forwarding policy in the overlay network can be reflected in the underlay network. In particular, a network device in the underlay network may transmit a packet from the overlay network according to the forwarding policy in the overlay network in a way that different processing is performed in the underlay network for different packets from the overlay network. In particular, when different packets correspond to different forwarding policies, a packet may be forwarded according to a forwarding policy corresponding to the packet. For example, when a packet 1 corresponds to a forwarding policy 1 and a packet 2 corresponds to a forwarding policy 2, the packet 1 is transmitted according to the forwarding policy 1 and the packet 2 is transmitted according to the forwarding policy 2 in the underlay network. Further, a forwarding policy of filtering packet may be set for a packet transmitted by an attacker in a way that the packet transmitted by the attacker cannot be transmitted in the underlay network, thereby ensuring security of the underlay network. Since a packet transmitted by a legitimate user is not matched to the forwarding policy of filtering packet, the packet transmitted by the legitimate user may be normally transmitted in the underlay network.

Figure 2:
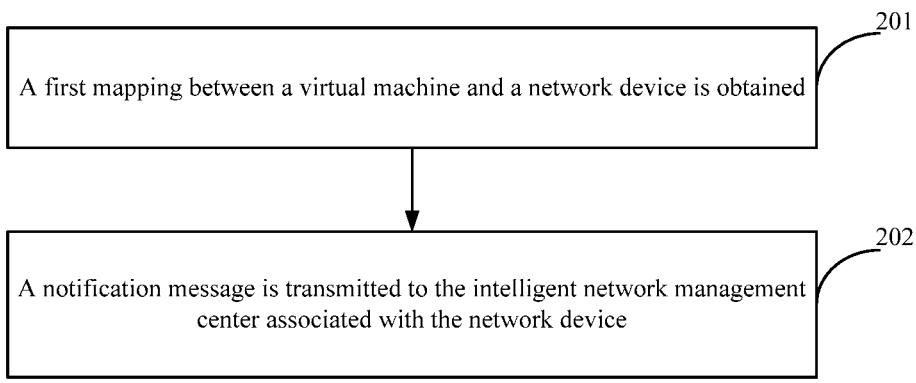
FIG. 2 is a flowchart illustrating a method of configuring a forwarding policy according to an example of the present disclosure.

In the application scenario above in FIG. 2, according to an example of the present disclosure, a method of configuring a forwarding policy may apply to a cloud management platform. The method includes procedures as follows.

At block 201, a first mapping between a virtual machine and a network device is obtained.

In an example, a relationship between positions of the virtual machine and the network device may be maintained.

In an example, a process of maintaining the relationship between positions of the virtual machine and the network device may include but not limited to: maintaining the first mapping among virtual machine information, a device identifier of a network device connected with a physical server in which the virtual machine is located, and a port identifier of a port connected with the physical server on the network device.

Figure 3:
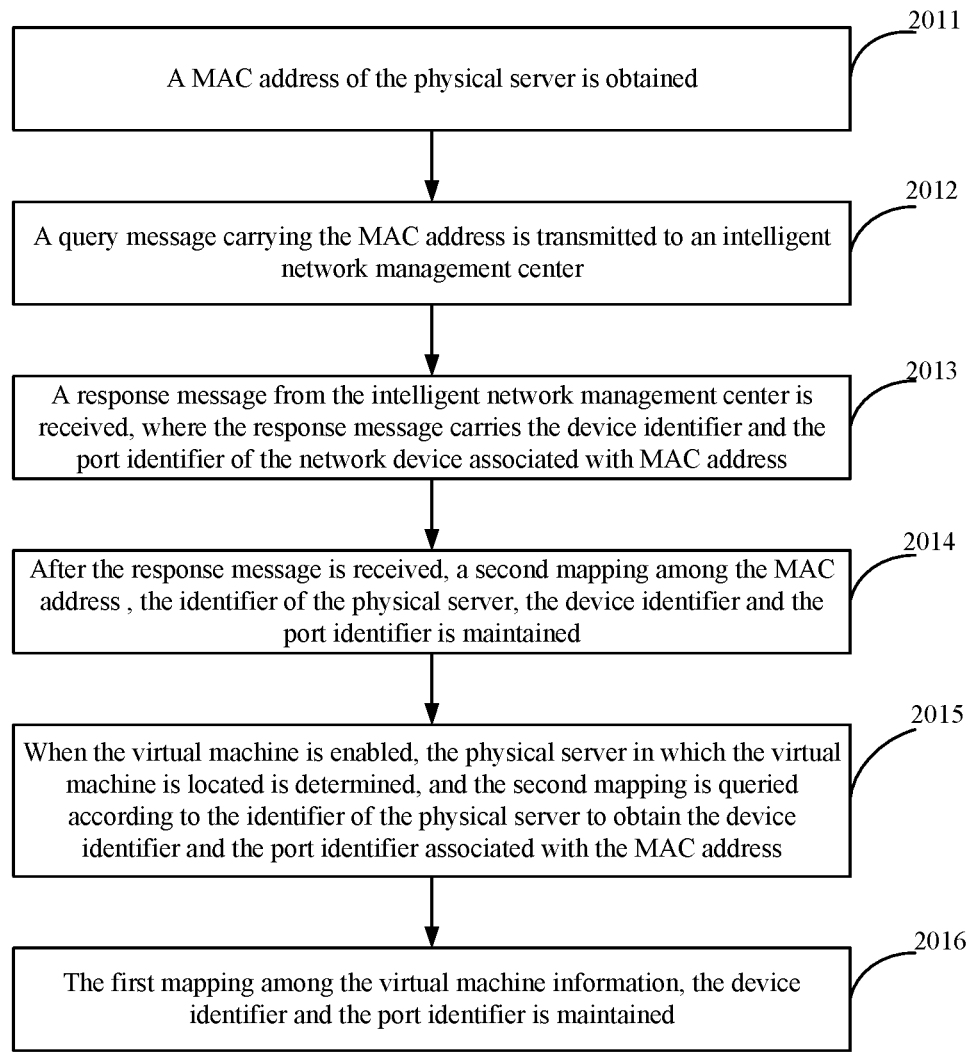
FIG. 3 is a flowchart illustrating a process of maintaining a first mapping according to an example of the present disclosure.

In an example, in block 201, as shown in FIG. 3, the process of maintaining the first mapping may include but not limited to the following methods.

At block 2011, a Media Access Control (MAC) address of the physical server is obtained. After a physical server starts, since the physical server is managed by a cloud management platform, the cloud management platform may collect a MAC address of the physical server, and maintain a mapping between an identifier and the MAC address of the physical server, as shown in Table 1.

TABLE 1

| Identifier of Physical Server | MAC Address of Physical Server |
|---|---|
| Physical server 1 | MAC 1 |
| Physical server 2 | MAC 2 |
| Physical server 3 | MAC 3 |
| ... | ... |
| Physical server N | MAC N |

At block 2012, a query message carrying the MAC address is transmitted to an intelligent network management center.

In an example, when the cloud management platform needs to query a network device associated with one or more MAC addresses (e.g., MAC1, MAC2, MAC3), the cloud management platform may transmit a query message carrying the one or more MAC addresses to the intelligent network management center. In order to make description clearer, take that the query message carriers MAC1 as an example. A processing way for a query message carrying a plurality of MAC addresses is similar as that for the query message carrying MAC1, which is not redundantly described. In this example, the query message is used for querying a device identifier of a network device connected with a physical server 370 (i.e., the physical server corresponding to MAC1) and a port identifier of a port connected with the physical server 370 on a network device.

In an example, the query message may be a message in a format of a Representational State Transfer (REST) Application Programming Interface (API). Alternatively, the query message may be a message in another format in practical applications. A processing process for the query message in another format is similar as that for the message in the REST API format, which is not redundantly described herein. Further, the format of the message is not limited in examples of the present disclosure.

In an example, the query message in the REST API format may include the following fields: an interface type field, an interface Uniform Resource Locator (URL) field and a parameter field. The interface type field indicates that the device identifier of the network device and the port identifier of the port are queried according to a MAC address. The interface URL field includes an URL associated with the intelligent network management center, and the query message may be transmitted to the intelligent network management center according to the interface URL field. The parameter field carries a MAC address used for query, e.g., MAC 1 above.

At block 2013, a response message from the intelligent network management center is received, where the response message carries the device identifier and the port identifier of the network device associated with MAC address (i.e., the MAC address carried in the query message).

In an example, the intelligent network management center may obtain a MAC entry associated with a physical server from a network device managed by the intelligent network management center itself. The MAC entry may record the MAC address of the physical server learned by the network device and the port identifier associated with the MAC address. Further, the intelligent network management center may maintain a mapping among the MAC address, the port identifier and the device identifier of the network device in local.

After receiving the query message carrying the MAC address from the cloud management platform, the intelligent network management center may query a mapping according to the MAC address, obtain the port identifier and the device identifier associated with the MAC address, and transmit the response message carrying the port identifier and the device identifier to the cloud management platform. And, the cloud management platform may receive the response message carrying the port identifier and the device identifier.

In the process that the intelligent network management center obtains the MAC entry from the network device managed by the intelligent network management center itself, since various network devices (e.g., the network device 340, the network device 350, the network device 360, the network device 210 and the network device 220) are managed by the intelligent network management center, the intelligent network management center may directly transmit to each of the network devices managed by the intelligent network management center itself a MAC entry querying command, e.g., a Management Information Base (MIB)-based MAC entry querying command, or a Simple Network Management Protocol (SNMP)-based MAC entry querying command. The query command indicates a request of obtaining the MAC entry of the physical server learned by the network device.

When receiving a packet from the physical server after the physical server starts, the network device connected with the physical server may learn the MAC entry associated with the physical server, where the MAC entry records the MAC address of the physical server and the port identifier of the port connected with the physical server on the network device. After receiving the MAC entry querying command from the intelligent network management center, the network device may transmit the learned MAC entry in local to the intelligent network management center. For example, Table 2 shows an example of the MAC entry learned by the network device 340. Accordingly, MAC entries respectively learned by the network device 350 and the network device 360 are similar as that shown in Table 2, which is not redundantly described herein.

TABLE 2

| MAC Address | Port identifier |
|---|---|
| MAC 1 | Port 341 |

After each of the network devices transmits the learned MAC entry in local to the intelligent network management center, the intelligent network management center may obtain the MAC entry from the network device managed by intelligent network management center itself.

In the process that the intelligent network management center in local maintains the mapping among the MAC address, the port identifier and the device identifier of the network device, the intelligent network management center may maintain a mapping among the MAC address, the port identifier and the device identifier as shown in Table 3. For example, after receiving the MAC entry (as shown in Table 2) from the network device 340, the intelligent network management center may record the MAC1 and the port 1 in the MAC entry to Table 3, and may further record the device identifier of the network device 340 to Table 3. In another example, after receiving the MAC entry from the network device 350 and the MAC entry from the network device 360, the intelligent network management center may record related information into Table 3, and maintain the mapping as shown in Table 3.

TABLE 3

| MAC Address | Device Identifier | Port Identifier |
|---|---|---|
| MAC1 | Network device 340 | Port 341 |
| MAC2 | Network device 350 | Port 351 |
| MAC3 | Network device 360 | Port 361 |

In an example, the MAC entry learned by the network device may further include Virtual Local Area Network (VLAN) information. For example, Table 4 includes the VLAN information. Accordingly, when maintaining the mapping as shown in Table 3, the intelligent network management center may further record the VLAN information into the mapping as shown in Table 4. In practical applications, the mapping may further include other information, which is not limited in examples of the present disclosure. Table 3 or Table 4 is just taken as examples.

TABLE 4

| MAC Address | Device Identifier | Port Identifier | VLAN Information |
|---|---|---|---|
| MAC1 | Network device 340 | Port 341 | 100 |
| MAC2 | Network device 350 | Port 351 | 200 |
| MAC3 | Network device 360 | Port 361 | 300 |

In the process that the intelligent network management center queries the mapping according to the MAC address and obtains the corresponding port identifier and the corresponding device identifier, after receiving the query message carrying the MAC1 from the cloud management platform, the intelligent network management center may obtain the port identifier port 341 and the device identifier network device 340 by querying Table 3 or Table 4. In addition, the intelligent network management center may further obtain the VLAN information 100.

In the process that the intelligent network management center transmits the response message carrying the port identifier and the device identifier to the cloud management platform, the response message may be a message in the REST API format. In practical applications, the response message may be a message in another format. A processing process for the response message in another format is similar as that for the message in the REST API format, which is not redundantly described herein. The format of the response message is not limited in examples of the present disclosure. In an example, the response message in the REST API format may include at least the following fields: an interface type field and a parameter field. The interface type field indicates that the message is the response message. The parameter field carries the MAC 1, the network device 340, and the port 341. In an example, the parameter field may further carry the VLAN information 100.

In an example, after receiving the query message carrying the MAC address of the physical server from the cloud management platform, the intelligent network management center may obtain the port identifier associated with the MAC address from the network device managed by the intelligent network management itself, and transmit the response message carrying the port identifier and the device identifier of the network device to the cloud management platform. And the cloud management platform receives the response message carrying the device identifier and the port identifier.

In the process that the intelligent network management center obtains the port identifier associated with the MAC address from the network device managed by the intelligent network management center itself, after receiving the query message from the cloud management platform, the intelligent network management center may parse the query message to obtain the MAC address, e.g., the MAC1. The intelligent network management center manages various network devices, thus, the intelligent network management center may directly transmit a MAC entry querying command to each of the network devices managed by the intelligent network management center itself, e.g., an MIB-based MAC entry querying command or an SNMP-based MAC entry querying command. The MAC entry querying command indicates a request that the network device which has learned the MAC1 feeds back the MAC entry associated with the MAC1.

When receiving a packet from the physical server after the physical server starts, the network device connected with the physical server may learn the MAC entry associated with the physical server, where the MAC entry records the MAC address of the physical server and the port identifier of the port connected with the physical server on the network device. After receiving the MAC entry querying command carrying the MAC1 from the intelligent network management center, the network device may determine whether there is a MAC entry associated with the MAC1 in local. If yes, the network device transmits the MAC entry associated with the MAC1 to the intelligent network management center. If no, the network device does not transmit any MAC entry to the intelligent network management center. In this example, the network device 340 transmits the MAC entry shown in Table 2 to the intelligent network management center, and neither the network device 350 nor the network device 360 transmits the MAC entry.

In the process that the intelligent network management center transmits the response message carrying the port identifier and the device identifier of the network device to the cloud management platform, after receiving the MAC entry from the network device 340, the intelligent network management center may obtain the device identifier the network device 340, and transmit the port identifier port 341 and the device identifier network device 340 to the cloud management platform through the response message. The response message may be a message which is in the REST API format and carries the MAC1, the device identifier network device 340, and the port identifier port 341.

In an example, the MAC entry learned by the network device may further include the VLAN information. And the response message transmitted from the intelligent network management center may further carry the VLAN information, e.g., 100.

In this block, when the intelligent network management center does not obtain the port identifier and the device identifier associated with the MAC1, a failure message may be transmitted to the cloud management platform, which is not described in detail.

At block 2014, after the response message is received, a second mapping among the MAC address (i.e., the MAC address of the physical server), the identifier of the physical server, the device identifier and the port identifier is maintained.

After receiving the response message, the cloud management platform may parse the response message to obtain the device identifier and the port identifier, e.g., the network device 340 and the port 341. In an example, the response message may not carry the MAC address. Since the response message is a response message associated with the query message carrying the MAC1, it may be determined that the MAC1 corresponds to the network device 340 and the port 341. In another example, when the response message carries the MAC 1, it may be directly determined that the MAC1 corresponds to the network device 340 and the port 341.

The cloud management platform may obtain the mapping among the MAC address, the device identifier and the port identifier. And the cloud management platform may query the mapping as shown in Table 1 according to the MAC address to obtain the identifier of the physical server, and may maintain the second mapping among the MAC address, the identifier of the physical server, the device identifier, and the port identifier. Table 5 shows an example of the second mapping. Further, the cloud management platform may parse the response message to obtain the VLAN information, and obtain the mapping among the MAC address, the identifier of the physical server, the device identifier, the port identifier and the VLAN information. Accordingly, the second mapping may further include the VLAN information. Table 6 shows another example of the second mapping including the VLAN information.

TABLE 5

| Identifier of Physical Server | MAC Address | Device Identifier | Port identifier |
|---|---|---|---|
| Physical Server 370 | MAC1 | Network device 340 | Port 341 |
| Physical Server 380 | MAC2 | Network device 350 | Port 351 |
| Physical Server 390 | MAC3 | Network device 360 | Port 361 |

TABLE 6

| Identifier of Physical Server | MAC Address | Device Identifier | Port Identifier | VLAN Information |
|---|---|---|---|---|
| Physical Server 370 | MAC1 | Network device 340 | Port 341 | 100 |
| Physical Server 380 | MAC2 | Network device 350 | Port 351 | 200 |
| Physical Server 390 | MAC3 | Network device 360 | Port 360 | 300 |

At block 2015, when the virtual machine is enabled, the physical server in which the virtual machine is located is determined, and the second mapping is queried according to the identifier of the physical server to obtain the device identifier and the port identifier associated with the MAC address.

In an example, the virtual machine is managed by the cloud management platform, and the cloud management platform may assign a virtual machine for a tenant on the physical server. Thus, the cloud management platform may know the physical server in which the virtual machine is located. For example, the virtual machine 371, the virtual machine 372 and the virtual machine 373 are located in the physical server 370. When a virtual machine (e.g., the virtual machine 371) is enabled (for example, the virtual machine starts), the cloud management platform may directly determine that the physical server 370 corresponds to the virtual machine 371, and query the second mapping in Table 5 or Table 6 according to the identifier of the physical server 370 (e.g., the physical server 1) to obtain the network device 340 and the port 341.

At block 2016, the first mapping among the virtual machine information, the device identifier and the port identifier is maintained.

In an example, the first mapping may be shown in Table 7, Table 8 or Table 9. These tables are merely several examples of the first mapping, which are not limited in examples of the present disclosure.

TABLE 7

| Virtual machine Information | Device Identifier | Port Identifier |
|---|---|---|
| Virtual machine 371 | Network device 340 | Port 341 |
| Virtual machine 372 | Network device 340 | Port 341 |
| Virtual machine 373 | Network device 340 | Port 341 |
| Virtual machine 381 | Network device 350 | Port 351 |
| Virtual machine 382 | Network device 350 | Port 351 |
| Virtual machine 383 | Network device 350 | Port 351 |
| Virtual machine 391 | Network device 360 | Port 361 |
| Virtual machine 392 | Network device 360 | Port 361 |
| Virtual machine 393 | Network device 360 | Port 361 |

TABLE 8

| Virtual machine Information | Identifier of Physical Server | MAC Address | Device Identifier | Port identifier |
|---|---|---|---|---|
| Virtual machine 371 | Physical Server 370 | MAC1 | Network device 340 | Port 341 |
| Virtual machine 372 | Physical Server 370 | MAC1 | Network device 340 | Port 341 |
| Virtual machine 373 | Physical Server 370 | MAC1 | Network device 340 | Port 341 |
| Virtual machine 381 | Physical Server 380 | MAC2 | Network device 350 | Port 351 |
| Virtual machine 382 | Physical Server 380 | MAC2 | Network device 350 | Port 351 |
| Virtual machine 383 | Physical Server 380 | MAC2 | Network device 350 | Port 351 |
| Virtual machine 391 | Physical Server 390 | MAC3 | Network device 360 | Port 361 |
| Virtual machine 392 | Physical Server 390 | MAC3 | Network device 360 | Port 361 |
| Virtual machine 393 | Physical Server 390 | MAC3 | Network device 360 | Port 361 |

TABLE 9

| Virtual machine Information | Identifier of Physical Server | MAC Address | Device Identifier | Port identifier | VLAN Information |
|---|---|---|---|---|---|
| Virtual machine 371 | Physical Server 370 | MAC1 | Network device 340 | Port 341 | 100 |
| Virtual machine 372 | Physical Server 370 | MAC1 | Network device 340 | Port 341 | 100 |
| Virtual machine 373 | Physical Server 370 | MAC1 | Network device 340 | Port 341 | 100 |
| Virtual machine 381 | Physical Server 380 | MAC2 | Network device 350 | Port 351 | 200 |
| Virtual machine 382 | Physical Server 380 | MAC2 | Network device 350 | Port 351 | 200 |
| Virtual machine 383 | Physical Server 380 | MAC2 | Network device 350 | Port 351 | 200 |
| Virtual machine 391 | Physical Server 390 | MAC3 | Network device 360 | Port 361 | 300 |
| Virtual machine 392 | Physical Server 390 | MAC3 | Network device 360 | Port 361 | 300 |
| Virtual machine 393 | Physical Server 390 | MAC 3 | Network device 360 | Port 361 | 300 |

At block 202, a notification message is transmitted to the intelligent network management center associated with the network device.

The notification message carries the virtual machine information of the virtual machine and the network device information of the network device, so that the intelligent network management center configures a forwarding policy associated with the virtual machine for the network device according to the notification message. The forwarding policy instructs the network device to perform processing for a packet associated with the virtual machine.

In an example, the notification message is transmitted to the intelligent network management center according to the relationship between the positions of the virtual machine and the network device. The notification message carries the virtual machine information and the network device information, so that the intelligent network management center configures a forwarding policy associated with the virtual machine for the network device according to the notification message. The forwarding policy is used for the network device to process a packet from the virtual machine.

In an example, in the first mapping among the virtual machine information, the device identifier of the network device and the port identifier of the port, the virtual machine information may be packet characteristic information of the virtual machine, and the network device information may be the device identifier (the device identifier of the network device connected with the physical server in which the virtual machine is located) and the port identifier (the port identifier of the port connected with the physical server on the network device).

In an example, the forwarding policy is used for the network device to trust a policy in a packet which is received via the port (the port corresponding to the port identifier) and carries the packet characteristic information.

In an example, the packet may include, but not limited to, a VXLAN packet. The packet characteristic information may include, but not limited to, a VXLAN identifier. The virtual machine is managed by the cloud management platform, and a VXLAN identifier corresponding to each virtual machine is assigned by the cloud management platform. Thus, the cloud management platform may acquire the VXLAN identifier corresponding to each virtual machine, e.g., a VXLAN identifier 100 corresponds to the virtual machine 371. The cloud management platform may further record the VXLAN identifier corresponding to each virtual machine in the first mapping described above, so that the VXLAN identifier corresponding to the virtual machine may be directly obtained by querying the first mapping.

In an example, the notification message may be a message in the REST API format. In practical applications, the notification message may be a message in another format. A processing process for the notification message in another format is similar as that for the notification message in the REST API format, which is not redundantly described herein. The format of the notification message is not limited in examples of the present disclosure.

In an example, take that a notification message is transmitted to the virtual machine 371 as example. The notification message in the REST API format may at least include the following fields: an interface type field, an interface URL field and a parameter field. The interface type field indicates that the message is used to set a policy of trusting a VXLAN packet with a designated VXLAN identifier for a port on a network device. The interface URL field includes the URL of the intelligent network management center. And the notification message may be transmitted to the intelligent network management center according to the interface URL field. The parameter field includes the VXLAN identifier of the virtual machine 371, the device identifier 340 of the network device associated with the virtual machine 371, and the port identifier 371 of the port 341 associated with the virtual machine 340.

In an example, after receiving the notification message, the intelligent network management center may acquire the packet characteristic information, the device identifier and the port identifier by parsing the notification message, configure the forwarding policy for the network device associated with the device identifier, and issue the forwarding policy to the network device. The forwarding policy is used for the network device to trust a policy in a packet which is received via the port (the port corresponding to the port identifier) and carries the packet characteristic information. For example, the forwarding policy is configured for the network device 340, and the forwarding policy is used for the network device 340 to trust a policy in the VXLAN packet which is received via the port 341 and carries the VXLAN identifier 100.

In an example, the policy in the packet above may include, but not limited to, a forwarding priority. Take that the policy in the packet is a forwarding priority as an example below. Another policy may be processed in a similar manner.

Based on the process above, take that the virtual machine 371 transmits a packet to the virtual machine 381 as an example. After the packet arrives at the virtual machine 371 in a process that the virtual machine 371 transmits the packet to the virtual machine 381, a control flow table (issued from a controller to the virtual machine 371) matched to the packet is searched out. Based on the control flow table, the virtual machine 371 performs VXLAN encapsulation for the packet. For an outer IP header of the packet for which the VXLAN encapsulation has been performed (i.e., a VXLAN packet), a source IP address is an IP address of the virtual machine 371, a destination IP address is an IP address of the virtual switch 384, a VXLAN identifier is the VXLAN identifier 100 of the virtual machine 371, and a forwarding priority is carried in a Differentiated Services Code Point (DSCP) field. The forwarding priority may be configured according to actual requirements, the value of which is not limited in examples of the present disclosure. The virtual machine 371 transmits to the network device 340 the packet for which the VXLAN encapsulation has been performed.

The network device 340 is configured with a forwarding policy, where the forwarding policy is used for the network device 340 to trust the forwarding priority in the VXLAN packet which is received via the port 341 and carries the VXLAN identifier 100. Thus, the network device 340 may trust the forwarding priority (carried in the DSCP field) in the VXLAN packet after receiving the VXLAN packet via the port 341. According to the forwarding priority in the DSCP field, the network device 340 may forward the packet to the destination IP address (the IP address of the virtual switch 384). Further, in the VXLAN network, each network device may trust a processing result of the network device 340, thus, forward the packet according to the forwarding priority in the DSCP field. And the packet is transmitted to the virtual switch 384 according to the forwarding priority. The virtual switch 384 may obtain the original packet by removing an IP header added when the VXLAN encapsulation is performed. A source IP address associated with the original packet is an IP address of the virtual machine 371, and a destination IP address associated with the original packet is an IP address of the virtual machine 381. And the packet may be transmitted to the virtual machine 381. So far, the process of the packet transmission ends.

Based on the method above, each network device may forward a packet transmitted from the virtual machine 371 to the virtual machine 381 according to the forwarding priority in the DSCP field. In this way, in the network constructed by SDN and VXLAN, the network planning for the overlay network may be reflected in an underlay network. In particular, the forwarding priority in the network planning for the overlay network can be reflected in the underlay network. The packet from the overlay network may be transmitted in the underlay network according to the forwarding priority. Thus, in the underlay network, different processing for different packets from the overlay network is implemented. In particular, when different packets correspond to different forwarding policies, a packet may be forwarded according to a forwarding policy associated with the packet. For example, assume that a packet 1 corresponds to a forwarding policy 1, and a packet 2 corresponds to a forwarding policy 2. In the underlay network, the packet 1 is transmitted according to the forwarding policy 1, and the packet 2 is transmitted according to the forwarding policy 2. Further, a forwarding policy of filtering packet may be set for a packet transmitted from an attacker, so that the packet transmitted from the attacker cannot be transmitted in the underlay network, thereby ensuring security of the underlay network. In addition, a packet transmitted from a legitimate user may not be matched to the forwarding policy of filtering packet, thus, the packet transmitted from the legitimate user may be normally transmitted in the underlay network.

In an example, when the first mapping among the virtual machine, the device identifier and the port identifier is changed, the cloud management platform may further update the first mapping maintained in local according to the changed first mapping, and may transmit a deletion message to the intelligent network management center, where the deletion message instructs the intelligent network management center to delete the forwarding policy which has been configured for the network device. Further, the cloud management platform may transmit a notification message to the intelligent network management center according to the changed first mapping.

In a condition, the cloud management platform may periodically obtain the first mapping among the virtual machine, the device identifier and the port identifier, e.g., obtaining the first mapping every 24 hours. An obtaining method is as shown in block 201. When the first mapping obtained currently is same as the first mapping maintained in local, the network device connected with the physical server is not changed, and the method ends. When the first mapping obtained currently is different from the first mapping maintained in local, the network device connected with the physical server has been changed, the cloud management platform may update the first mapping maintained in local (i.e., updating the first mapping maintained in local according to the changed first mapping), and transmit a deletion message to the intelligent network management center, where the deletion message instructs the intelligent network management center to delete a forwarding policy which has been configured for a network device, and further transmits a notification message to the intelligent network management center according to the changed first mapping.

A process of transmitting the notification message is similar as that in block 202, which is not redundantly described. A process of transmitting the deletion message is described below. The deletion message may be a message in the REST API format. In practical applications, the deletion message may be a message in another format. And a processing process for the deletion message in another format is similar as that for the deletion message in the REST API format, which is not redundantly described herein. The format of the message is not limited in examples of the present disclosure.

In an example, assume that the first mapping associated with the virtual machine 374 is changed, a deletion message in the REST API format may include the following fields: an interface type field, an interface URL field and a parameter field. The interface type field expresses that the message instructs to delete a forwarding policy configured for a network device. The interface URL field includes the URL of an intelligent network management center. And the deletion message may be transmitted to the intelligent network management center according to the interface URL field. And the parameter field carries a VXLAN identifier of the virtual machine 371, the network device 340 (the device identifier), and the port 341 (the port identifier).

After receiving the deletion message, the intelligent network management center may delete the forwarding policy previously configured for the port associated with the port identifier associated with the device identifier on the network device.

In another condition, when a virtual machine migrates from one physical server to another physical server, the cloud management platform may obtain the first mapping among the virtual machine information, the device identifier and the port identifier, update the first mapping maintained in local according to the currently obtained first mapping (i.e., updating the first mapping maintained in local with the changed first mapping), and transmit a delete message to the intelligent network management center, where the deletion message instructs the intelligent network management center to delete the forwarding policy previously configured for the network device. Further, the cloud management platform may transmit the notification message to the intelligent network management center according to the changed first mapping.

Herein, the process of obtaining the first mapping, the process of transmitting the notification message and the process of transmitting the deletion message are similar as the respective processing processes above, which are not redundantly described herein.

In an example, when a virtual machine is turned off, the cloud management platform may transmit a deletion message (carrying the VXLAN identifier, the device identifier and the port identifier of the virtual machine) to the intelligent network management center, where the deletion message instructs the intelligent network management center to delete the forwarding policy previously configured for the network device. The process of transmitting the deletion message is similar as the processing process above, which is not redundantly described herein.

Figure 4:
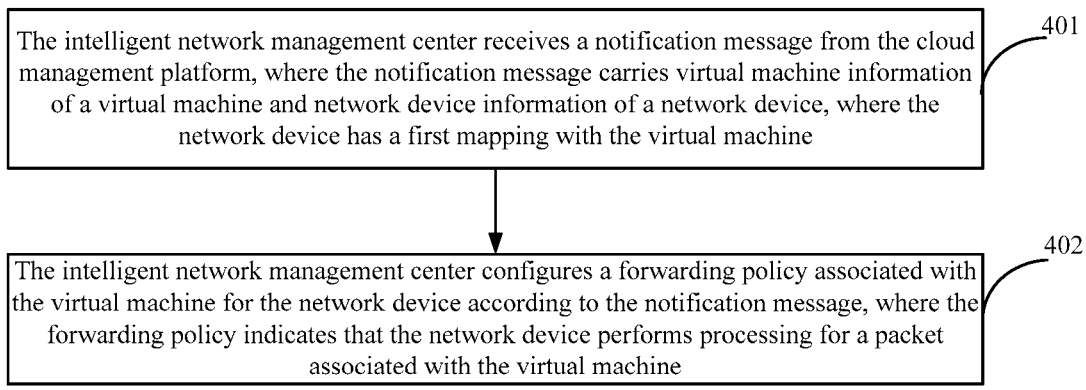
FIG. 4 is a flowchart illustrating a method of configuring a forwarding policy according to an example of the present disclosure.

FIG. 4 is a flowchart illustrating a method of configuring a forwarding policy according to an example of the present disclosure. The method may apply to an intelligent network management center, and the method of configuring a forwarding policy may include procedures as follows.

At block 401, the intelligent network management center receives a notification message from the cloud management platform.

In an example, the notification message carries virtual machine information of a virtual machine and network device information of a network device, where the network device has a first mapping with the virtual machine.

In an example, the notification message carries virtual machine information of a virtual machine and network device information of a network device, where there is a relationship between positions of the network device and the virtual machine.

At block 402, the intelligent network management center configures a forwarding policy associated with the virtual machine for the network device according to the notification message, where the forwarding policy instructs the network device to perform processing for a packet associated with the virtual machine.

A processing process of the intelligent network management center is the same as the processing process of the intelligent network management center as shown in FIG. 2, which is not redundantly described in examples of the present disclosure.

The methods according to the present disclosure are described above. Devices according to the present disclosure are described below.

Figure 5:
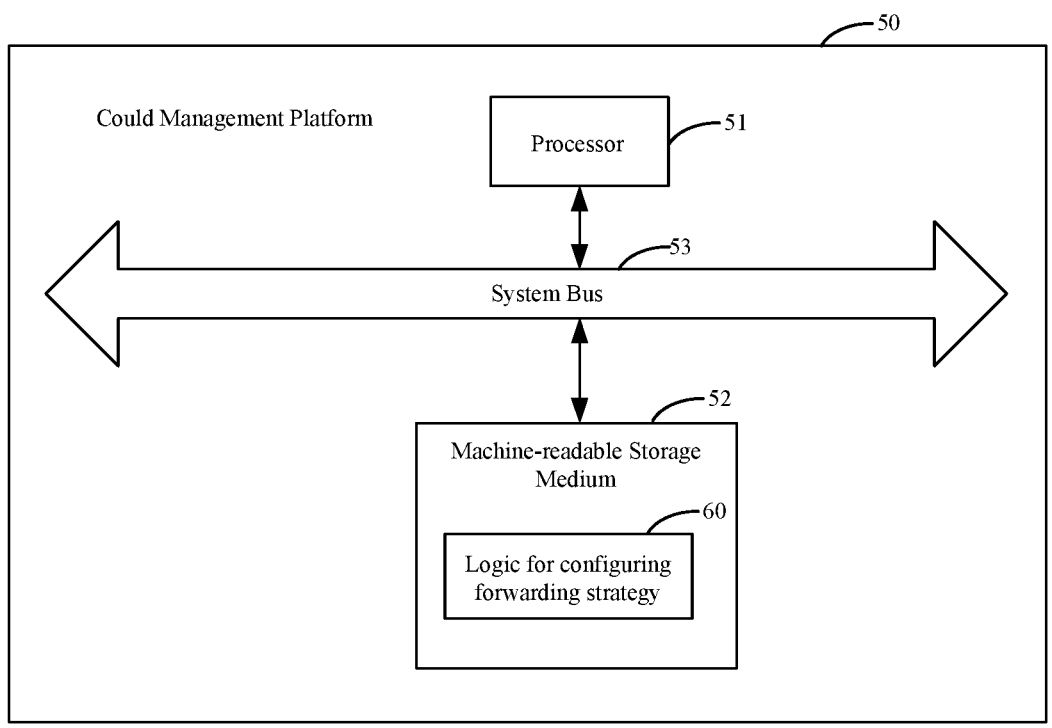
FIG. 5 is a schematic diagram illustrating a hardware structure of a cloud management platform according to an example of the present disclosure.

FIG. 5 illustrates a hardware structure of a cloud management platform according to an example of the present disclosure. The cloud management platform 50 may include a processor 51 and a machine-readable storage medium 52. The processor 51 and the machine-readable storage medium 52 may communicate with each other via a system bus 53. Also, the processor 51 may execute the method of configuring a forwarding policy described above by reading and executing machine executable instructions which correspond to a logic for configuring a forwarding policy 60 and are stored in the machine-readable storage medium 52.

The machine readable storage medium 52 described herein may be any electronic, magnetic, optical or other physical storage device, and may contain or store information, such as executable instructions, data and the like. For example, the machine readable storage medium 52 may be a Random Access Memory (RAM), a volatile memory, a non-volatile memory, a flash memory, a storage drive (e.g., hard disk drive), a solid state disk, any type of storage disk (e.g., optical disk, Digital Video Disk (DVD)), or a similar storage medium, or a combination thereof.

Figure 6:
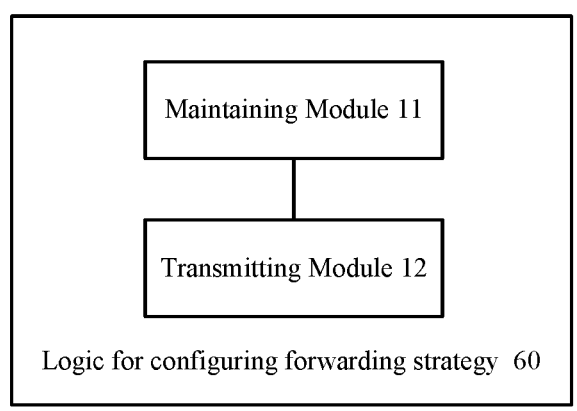
FIG. 6 is a schematic diagram illustrating a structure of a logic for configuring a forwarding policy according to an example of the present disclosure.

As shown in FIG. 6, functionally, the logic for configuring a forwarding policy 60 may include modules as follows.

A maintaining module 11 is configured to obtain a first mapping between a virtual machine and a network device.

A transmitting module 12 is configured to transmit a first notification message to an intelligent network management center associated with the network device in a way that the intelligent network management center configures a forwarding policy associated with the virtual machine for the network device according to the first notification message, wherein the first notification message comprises virtual machine information of the virtual machine and network device information of the network device, and the forwarding policy instructs the network device to perform processing for a packet associated with the virtual machine.

In an example, the first mapping comprises a mapping among the virtual machine information, a device identifier of the network device, and a port identifier of a port on the network device, wherein the network device is connected with a physical server in which the virtual machine is located through the port.

In an example, the maintaining module 11 is configured to determine the physical server in which the virtual machine is located when the virtual machine is enabled; acquire the device identifier and the port identifier by searching out a corresponding second mapping according to a Media Access Control (MAC) address of the physical server, wherein the second mapping comprises a mapping among the MAC address, an identifier of the physical server, the device identifier, and the port identifier; and generate the first mapping among the virtual machine information of the virtual machine, the device identifier and the port identifier.

In an example, the maintaining module 11 is further configured to transmit a query message to the intelligent network management center, wherein the query message comprises the MAC address of the physical server;

receive a response message from the intelligent network management center, wherein the response message comprises the device identifier and the port identifier respectively associated with the MAC address; and generate the second mapping among the MAC address, the identifier of the physical server, the device identifier and the port identifier.

In an example, the maintaining module 11 is further configured to update the first mapping in local when the first mapping is changed.

And the transmitting module 12 is further configured to transmit a deletion message to the intelligent network management center, wherein the deletion message instructs the intelligent network management center to delete the forwarding policy which has been configured for the network device; transmit a second notification message to the intelligent network management center, wherein the second notification message comprises virtual machine information and network device information associated with the updated first mapping.

Different modules of the logic according to the present disclosure may be integrated into one module, and may also be deployed separately. The above modules may be combined into one module, and may also be further split into a plurality of sub-modules.

Figure 7:
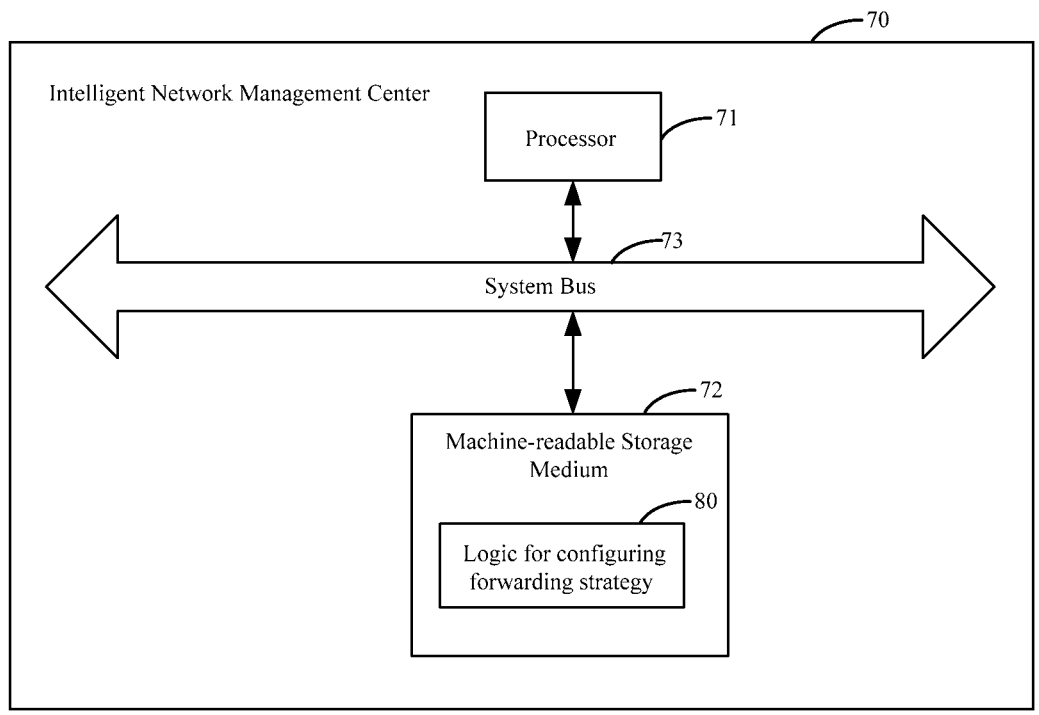
FIG. 7 is a schematic diagram illustrating a hardware structure of an intelligent network management center according to an example of the present disclosure.

FIG. 7 is a schematic diagram illustrating a hardware structure of an intelligent network management center according to an example of the present disclosure. The intelligent network management center 70 may include a processor 71 and a machine-readable storage medium 72. The processor 71 and the machine readable storage medium 72 may communicate with each other via a system bus 73. The processor 71 may execute the method of configuring a forwarding policy described above by reading and executing machine executable instructions which correspond to a logic for configuring a forwarding policy 80 and are stored in the machine readable storage medium 72.

The machine-readable storage medium 72 described herein may be any electronic, magnetic, optical or other physical storage device, and may contain or store information, such as executable instructions, data and the like. For example, the machine readable storage medium 72 may be a Random Access Memory (RAM), a volatile memory, a non-volatile memory, a flash memory, a storage drive (e.g., hard disk drive), a solid state disk, any type of storage disk (e.g., optical disk, Digital Video Disk (DVD)), or a similar storage medium, or a combination thereof.

Figure 8:
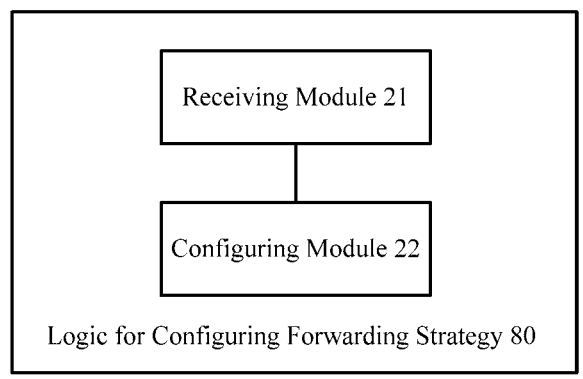
FIG. 8 is a schematic diagram illustrating a structure of a logic for configuring a forwarding policy according to an example of the present disclosure.

As shown in FIG. 8, functionally, the logic for configuring a forwarding policy 80 may include modules as follows:

A receiving module 21 is configured to receive a notification message from a cloud management platform, wherein the notification message comprises virtual machine information of a virtual machine and network device information of a first network device, wherein the first network device has a first mapping with the virtual machine.

A configuring module 22 configured to configure a forwarding policy associated with the virtual machine for the network device according to the notification message, wherein the forwarding policy instructs the network device to perform processing for a packet associated with the virtual machine.

In an example, the logic for configuring a forwarding policy also include (not shown in the figure):

an obtaining module configured to for each second network device managed by the intelligent network management center, obtain from the second network device a Media Access Control (MAC) entry associated with a physical server connected with the second network device, wherein the MAC entry records a MAC address of the physical server, and a port identifier of a port, the port being connected to the physical server on the second network device; generate a mapping among the MAC address, the port identifier, and the device identifier of the second network device according to the MAC entry; and a transmitting module configured to after receiving a query message carrying the MAC address of the physical server from the cloud management platform, obtain the port identifier and the device identifier by searching out the mapping according to the MAC address; transmit a response message carrying the port identifier and the device identifier to the cloud management platform.

In an example, the obtaining module is further configured to after receiving a query message carrying a MAC address of the physical server from the cloud management platform, obtain a port identifier associated with the MAC address from a third network device managed by the intelligent network management center.

The transmitting module is further configured to transmit a response message carrying the port identifier and a device identifier of the third network device to the cloud management platform.

In an example, the logic for configuring a forwarding policy further includes (not shown in the figure):

a deleting module configured to instruct the first network device to delete the configured forwarding policy after receiving a deletion message carrying the network device information from the cloud management platform.

Herein, different modules of the logic in the present disclosure may be integrated into one module, and may also be deployed separately. The above modules may be combined into one module, and may also be further split into a plurality of sub-modules.

From the foregoing descriptions of the implementations, it will be apparent for a person skilled in the art that the present disclosure may be implemented by means of software and necessary general-purpose hardware platform, and certainly, may also be implemented by means of hardware. However, in many cases, the former is the preferred implementation. Based on the understanding, the technical solutions in the present disclosure, in essence or the part making a contribution to the prior art may be embodied in the form of a software product, where the computer software product is stored in a storage medium and includes a number of instructions for causing a computer device (which may be a personal computer, a server, or a network device, etc.) to execute the method described in each example of the present disclosure. It will be understood by the person skilled in the art that the figures are merely the schematic diagrams of a preferred embodiment and the blocks or flows in the figures are not necessary for implementing the present disclosure.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It needs to be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of configuring a forwarding policy, comprising:

obtaining, by a cloud management platform, a first mapping between a virtual machine and a network device; and transmitting, by the cloud management platform, a first notification message to an intelligent network management center associated with the network device in a way that the intelligent network management center configures a forwarding policy associated with the virtual machine for the network device according to the first notification message, wherein the first notification message carries virtual machine information of the virtual machine and network device information of the network device, and the virtual machine information comprises packet characteristic information of the virtual machine, and the network device information comprises a device identifier of the network device and a port identifier of a port on the network device connected with a physical server in which the virtual machine is located; and the forwarding policy is to instruct the network device to trust a policy in a packet which is received via the port corresponding to the port identifier and carries the packet characteristic information, so as to forward, in an underlay network, the received packet according to a forwarding policy in which the virtual machine forwards the packet in an overlay network; wherein, the underlay network is constituted by virtual machines and virtual switches on various physical servers, and the overlay network is constituted by network devices connected with physical servers.

2. The method according to claim 1, wherein the first mapping comprises a mapping among the virtual machine information, a device identifier of the network device, and a port identifier of a port on the network device, wherein the network device is connected with a physical server in which the virtual machine is located through the port.

3. The method according to claim 2, wherein obtaining the first mapping comprises:

determining, by the cloud management platform, the physical server in which the virtual machine is located when the virtual machine is enabled;

obtaining, by the cloud management platform, the device identifier and the port identifier by searching out a corresponding second mapping according to a Media Access Control (MAC) address of the physical server, wherein the second mapping comprises a mapping among the MAC address, an identifier of the physical server, the device identifier, and the port identifier;

obtaining, by the cloud management platform, the first mapping among the virtual machine information of the virtual machine, the device identifier and the port identifier.

4. The method according to claim 3, further comprising:

transmitting, by the cloud management platform, a query message to the intelligent network management center, wherein the query message comprises the MAC address of the physical server;

receiving, by the cloud management platform, a response message from the intelligent network management center, wherein the response message carries the device identifier and the port identifier respectively associated with the MAC address;

obtaining, by the cloud management platform, the second mapping among the MAC address, the identifier of the physical server, the device identifier and the port identifier.

5. The method according to claim 1, further comprising:

updating the first mapping in local when the first mapping is changed;

transmitting a deletion message to the intelligent network management center, wherein the deletion message is to instruct the intelligent network management center to delete the forwarding policy which has been configured for the network device;

transmitting a second notification message to the intelligent network management center, wherein the second notification message carries virtual machine information and network device information associated with the updated first mapping.

6. A method of configuring a forwarding policy, comprising:

receiving, by an intelligent network management center, a notification message from a cloud management platform, wherein the notification message carries virtual machine information of a virtual machine and network device information of a first network device, wherein the first network device has a first mapping with the virtual machine, the virtual machine information comprises packet characteristic information of the virtual machine, and the network device information comprises a device identifier of the network device and a port identifier of a port on the network device connected with a physical server in which the virtual machine is located;

configuring, by the intelligent network management center, a forwarding policy associated with the virtual machine for the first network device according to the notification message, wherein the forwarding policy is to instruct the first network device to trust a policy in a packet which is received via the port corresponding to the port identifier and carries the packet characteristic information, so as to forward, in an underlay network, the received packet according to a forwarding policy in which the virtual machine forwards the packet in an overlay network; wherein, the underlay network is constituted by virtual machines and virtual switches on various physical servers, and the overlay network is constituted by network devices connected with physical servers.

7. The method according to claim 6, further comprising:

for each second network device managed by the intelligent network management center, performing, by the intelligent network management center, operations as follows:

obtaining, from a second network device, a Media Access Control (MAC) entry associated with a physical server connected with the second network device, wherein the MAC entry records a MAC address of the physical server, and a port identifier of a port connected to the physical server on the second network device;

obtaining a mapping among the MAC address, the port identifier, and a device identifier of the second network device according to the MAC entry;

after receiving a query message carrying the MAC address of the physical server from the cloud management platform, obtaining the port identifier and the device identifier by searching out the mapping according to the MAC address;

transmitting a response message carrying the port identifier and the device identifier to the cloud management platform.

8. The method according to claim 6, further comprising:

after receiving a query message carrying a MAC address of a physical server from the cloud management platform, obtaining, by the intelligent network management center, a port identifier associated with the MAC address from a third network device managed by the intelligent network management center;

transmitting, by the intelligent network management center, a response message carrying the port identifier and a device identifier of the third network device to the cloud management platform.

9. The method according to claim 6, further comprising:

instructing, by the intelligent network management center, the first network device to delete the configured forwarding policy after receiving a deletion message carrying the network device information from the cloud management platform.

10. A cloud management platform, comprising:

a processor, and a non-transitory machine-readable storage medium storing machine executable instructions which are executable by the processor to:

obtain a first mapping between a virtual machine and a network device; and transmit a first notification message to an intelligent network management center associated with the network device in a way that the intelligent network management center configures a forwarding policy associated with the virtual machine for the network device according to the first notification message, wherein the first notification message carries virtual machine information of the virtual machine and network device information of the network device, and the virtual machine information comprises packet characteristic information of the virtual machine, and the network device information comprises a device identifier of the network device and a port identifier of a port on the network device connected with a physical server in which the virtual machine is located; and the forwarding policy is to instruct the network device to trust a policy in a packet which is received via the port corresponding to the port identifier and carries the packet characteristic information, so as to forward, in an underlay network, the received packet according to a forwarding policy in which the virtual machine forwards the packet in an overlay network; wherein, the underlay network is constituted by virtual machines and virtual switches on various physical servers, and the overlay network is constituted by network devices connected with physical servers.

11. The cloud management platform according to claim 10, wherein the first mapping comprises a mapping among the virtual machine information, a device identifier of the network device, and a port identifier of a port on the network device, wherein the network device is connected with a physical server in which the virtual machine is located through the port.

12. The cloud management platform according to claim 10, wherein the instructions are to:

determine the physical server in which the virtual machine is located when the virtual machine is enabled;

obtain the device identifier and the port identifier by searching out a corresponding second mapping according to a Media Access Control (MAC) address of the physical server, wherein the second mapping comprises a mapping among the MAC address, an identifier of the physical server, the device identifier, and the port identifier;

obtain the first mapping among the virtual machine information of the virtual machine, the device identifier and the port identifier.

13. An intelligent network management center, comprising:

a processor, and a non-transitory machine-readable storage medium storing machine executable instructions which are executable by the processor to:

execute the method of configuring a forwarding policy described by claim 6.

14. A non-transitory machine-readable storage medium storing machine executable instructions which are invoked and executed by a processor to execute the method of configuring a forwarding policy described by claim 1.

15. A non-transitory machine-readable storage medium storing machine executable instructions which are invoked and executed by a processor to execute the method of configuring a forwarding policy described by claim 6.

* * * * *